United States Patent
Lindén et al.

(10) Patent No.: US 6,938,347 B2
(45) Date of Patent: Sep. 6, 2005

(54) SHEARS

(75) Inventors: Olavi Lindén, Billnäs (FI); Markus Paloheimo, Helsinki (FI)

(73) Assignee: Fiskars Consumer Oy Ab, Billnas (FI)

( * ) Notice: Subject to any disclaimer, the term of this patent is extended or adjusted under 35 U.S.C. 154(b) by 283 days.

(21) Appl. No.: 10/428,334

(22) Filed: May 2, 2003

(65) Prior Publication Data

US 2003/0229992 A1 Dec. 18, 2003

(30) Foreign Application Priority Data

May 3, 2002 (FI) .............................................. 20020846

(51) Int. Cl.⁷ .............................................. A01G 3/06
(52) U.S. Cl. ......................................... 30/251; 30/248
(58) Field of Search ........................ 30/248, 251, 190, 30/242, 252, 184; 172/13, 14, 17

(56) References Cited

U.S. PATENT DOCUMENTS

| | | | |
|---|---|---|---|
| 1,639,667 A | * | 8/1927 | Ranger ........................ 342/394 |
| 2,607,114 A | | 8/1952 | Keiser, Jr. |
| 2,672,684 A | | 3/1954 | Kalish |
| 2,923,058 A | | 2/1960 | Binkley |
| 3,038,257 A | * | 6/1962 | Caves ........................... 30/248 |
| 3,039,190 A | * | 6/1962 | Wallace ........................ 30/248 |
| 3,296,697 A | * | 1/1967 | Hedstrom ..................... 30/248 |
| 3,613,240 A | | 10/1971 | Wallace |
| 4,569,132 A | * | 2/1986 | Hill .............................. 30/251 |

FOREIGN PATENT DOCUMENTS

| AU | 423199 | 12/1999 |
|---|---|---|
| DE | 31 34 308 | 3/1983 |

* cited by examiner

Primary Examiner—Douglas D Watts
(74) Attorney, Agent, or Firm—Foley & Lardner LLP

(57) ABSTRACT

The invention relates to shears comprising a stationary blade (1) and a movable blade (2) which moves during the shearing movement of the shears. An operating mechanism (5) is arranged to affect a point of the pin (6) located at a distance from the movable blade (2). When the shears are being closed, a force is thus generated which also tries to pull the movable blade (2) towards and against the stationary blade (1) and to keep the blades (1, 2) in contact with each other. The operating mechanism (5) is arranged to affect the joint pin (6) through a sleeve-like part (7). The interior of the sleeve comprises two conical sections (8, 9), the narrowest point of the interior of the sleeve determining the point from which the sleeve-like part (7) affects the joint pin (6).

4 Claims, 1 Drawing Sheet

SHEARS

FIELD OF THE INVENTION

Figure 1:
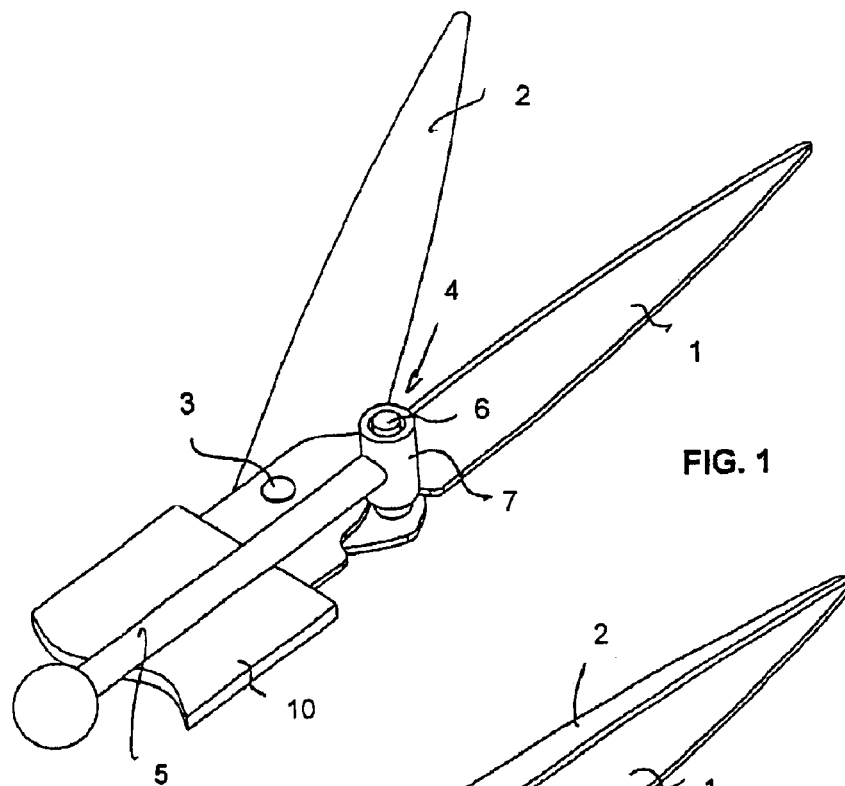

The present invention relates to shears comprising a first blade which is stationary during a shearing movement of the shears, and a second blade which moves during the shearing movement of the shears, a joint between the blades around which the movable blade is allowed to turn during the shearing movement between an open and a closed position with respect to the stationary blade, a second joint arranged at the side with respect to a line travelling via the joint between the blades and having a direction parallel with the longitudinal direction of the movable blade, the second joint comprising a pin projecting from the movable blade onto the side of the stationary blade, and an operating mechanism arranged to affect a point of the pin located at a distance from the movable blade and to direct to the second joint a force opening and closing the shears, the force also trying to pull the movable blade towards and against the stationary blade and to keep the blades in contact with each other when the shears are being closed.

Shears similar to those described above are known e.g. from U.S. Pat. No. 3,613,240. Such shears are used for several different purposes but more often than not, particularly garden shears of a certain type, such as grass shears, are implemented as described above. Namely, the described blade structure enables a mechanism wherein a clasp of a hand directed from below upwards can be simply changed into a horizontal movement of the blades, which is well suited for cutting grass in particular.

The idea underlying the shears described in the above-mentioned U.S. Pat. No. 3,613,240 is that unlike in several conventional grass shears, the movable blade is arranged below the stationary blade, but a pull bar affecting the movable blade is connected to the movable blade above the stationary blade. This is ensured by equipping the movable blade with a joint pin projecting from the plane of the movable blade, the pull bar directing its force at an upper end of the joint pin. The force trying to close the blades then, to some extent, pulls the movable blade towards and against the stationary blade, resisting the detachment of cutting edges of the blades from each other during the shearing phase and ensuring a continuous contact between the blades. Similarly, when the blades are opened, in addition to the force opening the blades, the pull bar directs to the movable blade a slightly downwards directed force which affects against the force of a spring pressing the blades against each other, trying to create a gap between the movable blade and the stationary blade. Such a lightening force component is preferable if material to be cut, such as grass, has stuck between the blades.

If, however, the shearing force of the shears is to be extraordinarily increased, e.g. when shearing strong straws or the like, the force tries to turn the joint pin of the movable blade the more extensively the stronger the force becomes. Non-restricted, this may damage the structure of the shears.

SUMMARY OF THE INVENTION

Considering the above-mentioned lack of restriction of the force pressing the blades against each other in the shearing phase and pressing the blades away from each other in the opening phase of the shears, the solution employed in the above-mentioned U.S. Pat. No. 3,613,240 cannot be regarded as being optimal in every way. In order to improve this characteristic, the shears of the present invention are characterized in that the operating mechanism is arranged to affect the pin through a sleeve-like part whose interior, through which the pin is conveyed, comprises two conical sections arranged to expand towards ends of the sleeve while the narrowest point of the sleeve resides at the intersection of the cones, the narrowest point of the interior of the sleeve determining the point from which the sleeve-like part affects the pin.

In the shears of the invention, the pin attached to the movable blade in order to move the movable blade in the closing and opening phases of the shears enables a lever arm and a subsequent torque to be achieved, forcing the blades against each other when the shears are being closed and away from each other when the shears are opened. In accordance with the invention, the pin attached to the movable blade is affected through the sleeve-like part. This sleeve provides restriction of the torque that, through the operating mechanism, can be directed to the blade in a direction pressing the blades against each other and, correspondingly, away from each other. In a conventional use, the point of the interior of the sleeve at which the diameter of the interior of the sleeve is at its smallest, i.e. the conical sections of the interior of the sleeve converge, is the point of the interior which directs a force to the pin of the movable blade. If, however, a large amount of material, such as grass, strongly resisting the closing of the blades, resides between the blades in the closing phase, a user of the shears will naturally use more force in order to close the shears. In such a case, due to the structural spring of the shears, such as resilience of the material of the blades and/or springing between the blades, the result is that the pin tilts with respect to the sleeve pulling the pin. When such tilting occurs, the double cone structure of the interior of the sleeve, however, relatively soon makes the sleeve come into contact with the pin along the entire length thereof, i.e. both the cone at the upper part and the cone at the lower part of the sleeve come into contact with the pin, in which case in practice, the tilting torque no longer increases even if the force were increased through the operating mechanism. Correspondingly, when the shears are opened, a situation may occur wherein the force trying to open the shears tries to tilt the pin, the results being similar to those described above, in which case the opening moment also becomes restricted.

LIST OF DRAWINGS

Figure 2:
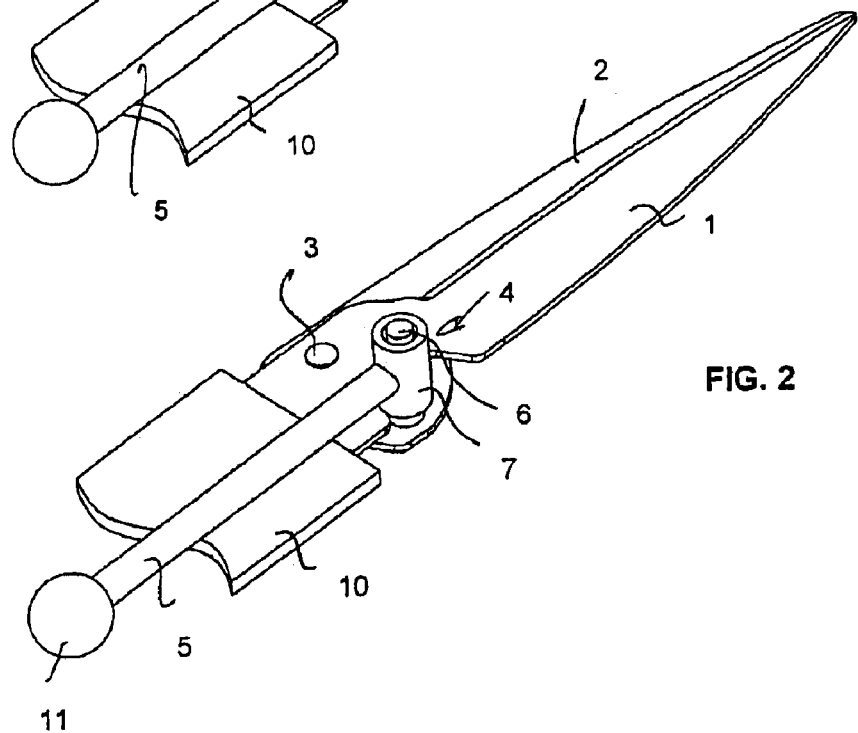
Figure 3:
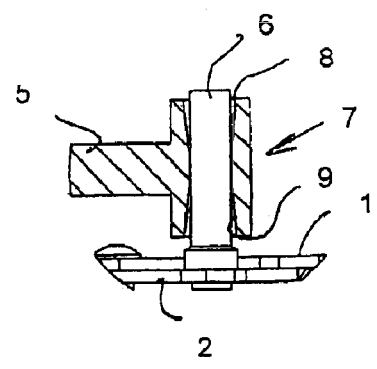

In the following, the shears of the invention will be described in closer detail and with reference to the accompanying drawing, in which FIG. 1 shows blades of shears according to an embodiment of the invention when the blades are in an open position, FIG. 2 shows the blades of FIG. 1 when the blades are in a closed position, and FIG. 3 shows a cross-section of a pin connected to a movable blade, and a sleeve surrounding the pin.

DETAILED DESCRIPTION OF THE INVENTION

FIGS. 1 and 2 show shears according to an embodiment of the invention in an open and a closed position, respectively. Only parts of the shears relevant to the invention are shown. The main part of an operating mechanism has thus been omitted but alternative implementations thereof will be discussed below.

The shears disclosed in FIGS. 1 and 2 comprise a blade 1 which is stationary during a shearing movement of the shears, and a second blade 2 which moves during the shearing movement of the shears and which is connected to the blade 1 by a rivet-like joint 3. This articulated joint allows the blade 2 to turn with respect to the blade 1 around the joint 3. In the embodiment shown in FIGS. 1 and 2, the joint 3 is shown to be a stiff one, i.e. a relatively tight joint with little play. Such pivoting is common in conventional scissors for cutting paper, for instance.

If the shears of the invention are to be used for other purposes, e.g. as grass shears, a spring is conventionally arranged in connection with the joint 3 to allow a restricted movement of the blade 2 also in the axial direction of the joint 3. Conventionally, such a sprung solution is implemented by extending the shaft of the rivet 3 and arranging a coil spring between the rivet head and the stationary blade 1. This coil spring forces the rivet 3 head as far from the stationary blade 1 as possible, pulling the blade 2, to which the bottom of the rivet is attached, towards and against the blade 1. Such a sprung structure is also disclosed in the above-mentioned U.S. Pat. No. 3,613,240.

In the shears of the invention, the blade 2 is moved by means of a pin 6 attached thereto. This pin is attached to the blade 2 at a point located at the side with respect to a straight line parallel with the longitudinal direction of the blade 2 and travelling via the joint 3. This pin 6 is attached to the blade 2 such that it projects therefrom in a substantially perpendicular direction. This structure of the pin 6 and the related operating mechanism is disclosed in closer detail as a cross-section in FIG. 3.

As can be seen in FIGS. 1 and 2, the pin 6 projects from the blade 2 to the side on which the stationary blade 1 resides during a shearing movement. In order to enable this, the blade 1 is provided with a notch which, on one hand enables the pin 6 to be brought past the blade 1 and which, on the other hand, restricts the path the blade 2 may follow during the shearing movement of the shears. In the situation of FIG. 1, wherein the shears are in an open position, the pin 6 thus resides at a first extreme end of the notch in the blade 1 and, in FIG. 2, wherein the shears are in a closed position, at a second extreme end of the notch. This enables the path the blade 2 is able to travel during the shearing movement to be restricted in a simple manner, and the blades are prevented from getting into undesired positions with respect to each other. The blade 2 is moved by means of an operating arm 5. The operating arm 5 is pivotally connected to the pin 6 through a generally cylindrical sleeve 7 arranged around the pin 6. The operating arm 5 is attached to the sleeve 7 substantially in the middle thereof, substantially from a perpendicular direction with respect to the longitudinal axis of the sleeve.

A ball-like part 11 is shown to be connected to an end away from the sleeve 7 of the operating arm 5. On the other hand, an extension of the blade 1 stationary during the shearing movement in the direction of the operating mechanism is shown to consist of a flat frame part 10 which, however, is shown cut. These parts 10 and 11 can well be connected to various operating mechanisms for moving the movable blade 2 with respect to the stationary blade 1. Hence, parts of the frame part 10 as well as the operating mechanism of the shears are shown in FIGS. 1 and 2 only as far as relevant to the invention.

It is to be noted that the operating mechanism of the blades may, as far as not shown in the figures, be similar to the operating mechanism of the blades already disclosed in the above-mentioned U.S. Pat. Specification No. 3,613,240. It describes an upper handle part connected to the frame 10 and a lower handle part pivotally connected both to the operating arm 5 and to the upper handle part. A return spring is arranged between the handle parts. When the lower handle part is pulled towards the upper handle part, the lower handle part pivotally connected to the upper handle part directs a pulling movement to the operating arm, the pulling movement closing the shears, and when the lower handle part is released, the release spring returns the lower handle part in its lower position, forcing the blades into the open position shown in FIG. 1. Such an operating mechanism is suited for use particularly when the shears are used either as conventional paper scissors or as grass shears.

If, on the other hand, the blade mechanism shown in FIGS. 1 and 2 were to be used from an end of a longer shaft, the mechanisms would have to be implemented substantially differently than what has been described above. An example is a solution wherein the frame part 10 would be connected to a longer shaft onto which a support arm would be supported whose first end would be pivotally connected to the knob 11 of the operating arm 5 and whose second end, in turn, would be connected e.g. to a drawstring, and a return spring as well, and after a shearing movement generated by pulling the drawstring, the return spring would return the blades in the open position shown in FIG. 1.

FIG. 3 shows in closer detail the structure of the operating pin 6 and particularly the sleeve 7 supported thereon. The cross-section of FIG. 3 shows that the interior of the sleeve 7 consists of two conical sections arranged to extend towards opposite ends of the sleeve, the narrowest point of the interior of the sleeve residing in the middle thereof, at the intersection of these cones. In FIG. 3, these conical surfaces have been designated by reference numbers 8 and 9, the surface 9 residing closer to the base of the pin 6 where the pin 6 is connected to the blade 2. When a pull is directed from the operating arm 5 to the pin 6 through the sleeve 7, the pull is naturally directed at the point in the pin 6 at which the sleeve 7 comes into contact therewith. In the embodiment of FIG. 3, the pulling point thus resides roughly at the middle of the sleeve 7, i.e. at a distance of half the length of the sleeve 7 from the blade 2. This is an essential point as far as the operation of the shears of the invention is concerned. When the structure of FIG. 3 is used, the pulling point is brought at a distance from the blade 2, a lever arm being provided between the pulling point and the blade 2. Hence, in addition to the pull directed at the operating pin resulting in a normal shearing movement of the blades 1 and 2, the lever arm also directs a torque at the blade 2 which, when the shears are being closed, pulls the blade 2 towards and against the blade 1, i.e. into a direction perpendicular to a normal direction of movement of the blade 2, and, correspondingly, when the shears are opened, the moment forces the blade 2 away from the blade 1 also in a direction perpendicular to the plane of the blades. The result is that when the shears are being closed, the blades, particularly in the case of the sprung joint 3, can be kept against each other during the closing movement of the blades more efficiently, thus ensuring a successful shear. On the other hand, the torque generated during the opening movement of the blades and forcing the blades away from each other makes the opening of the blades more efficient also when they, for one reason or another, more often than not due to material, such as grass, stuck between the blades, tend to stick together.

An aim of the double cone structure of the sleeve 7 shown in FIG. 3 is to restrict the magnitude of the above-mentioned torque. If, particularly when the blades are sprung with respect to each other, and also otherwise, as a result of the general resilience of the structure of the shears, the angle between the sleeve 7 and the pin 6 changes, i.e. the pin 6 tilts with respect to the sleeve 7 when a force stronger than a conventional one is used when the shears are being opened or closed, the result is that the conical sections of the sleeve 7 are also brought against the surface of the pin 6. In such a case, the contact point of the sleeve with the pin 6 moves closer to the blade 2, shortening the lever arm provided by the pin 2 and thus restricting the resulting torque. This phenomenon may occur in both directions of movement of the blade, i.e. both in a direction in which the blade 2 is pulled towards the blade 1 and in a direction in which the blade 2 is pushed away from the blade 1.

The shears of the invention have been described above by means of one exemplary embodiment only, and it is to be understood that they may be modified in several ways similar to those described above, particularly as far as the operating mechanism is concerned without, however, deviating from the scope defined by the attached claims.

What is claimed is:

1. Shears comprising
    a first blade which is stationary during a shearing movement of the shears,
    a second blade which moves during the shearing movement of the shears,
    a joint between the blades around which the movable blade is allowed to turn during the shearing movement between an open and a closed position with respect to the stationary blade,
    a second joint arranged at the side with respect to a line travelling via the joint between the blades and having a direction parallel with the longitudinal direction of the movable blade, the second joint comprising a pin projecting from the movable blade onto the side of the stationary blade, and
    an operating mechanism arranged to affect a point of the pin located at a distance from the movable blade and to direct to the second joint a force opening and closing the shears, the force also trying to pull the movable blade towards and against the stationary blade and to keep the blades in contact with each other when the shears are being closed,
    wherein the operating mechanism is arranged to affect the pin through a sleeve-like part whose interior, through which the pin is conveyed, comprises two conical sections arranged to expand towards ends of the sleeve while the narrowest point of the sleeve resides at the intersection of the cones, the narrowest point of the interior of the sleeve determining the point from which the sleeve-like part affects the pin.

2. Shears as claimed in claim 1, wherein the pin projects from the movable blade in a direction substantially perpendicular to the plane thereof.

3. Shears as claimed in claim 1, wherein the operating mechanism comprises an operating arm connected to the sleeve-like part and having a direction substantially parallel to the plane of the movable blade.

4. Shears as claimed in claim 3, wherein the operating arm is attached to the sleeve-like part substantially at its middle point.

* * * * *